(12) United States Patent
Chiu et al.

(10) Patent No.: US 10,171,808 B2
(45) Date of Patent: Jan. 1, 2019

(54) IN-LOOP ADAPTIVE WIENER FILTER FOR VIDEO CODING AND DECODING

(71) Applicant: Intel Corporation, Santa Clara, CA (US)

(72) Inventors: Yi-Jen Chiu, San Jose, CA (US); Lidong Xu, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/084,858

(22) Filed: Mar. 30, 2016

(65) Prior Publication Data
US 2016/0212424 A1 Jul. 21, 2016

Related U.S. Application Data

(60) Continuation of application No. 14/959,417, filed on Dec. 4, 2015, which is a division of application No.
(Continued)

(51) Int. Cl.
*G06K 9/40* (2006.01)
*H04N 19/117* (2014.01)
(Continued)

(52) U.S. Cl.
CPC ......... *H04N 19/117* (2014.11); *H04N 19/136* (2014.11); *H04N 19/157* (2014.11);
(Continued)

(58) Field of Classification Search
CPC .... H04N 19/172; H04N 19/61; H04N 19/117; H04N 19/136; H04N 19/177;
(Continued)

(56) References Cited

U.S. PATENT DOCUMENTS 5,187,364 A 2/1993 Blais
5,550,935 A 8/1996 Erdem et al.
(Continued)

FOREIGN PATENT DOCUMENTS

CN 1846444 A 10/2006
EP 1841230 A1 10/2007
WO 2007111292 A1 4/2007

OTHER PUBLICATIONS

Burr, G. W., et al., "Optimizing the holographic digital data storage channel," Jul. 1998, SPIE Conference on Advanced Optical Memories and Interfaces to Computer Systems, Paper 3468-10, Proceedings of the SPI, vol. 3468, 1998, (12 pages).
(Continued)

*Primary Examiner* — Gregory F Cunningham
(74) *Attorney, Agent, or Firm* — Trop, Pruner & Hu, P.C.

(57) ABSTRACT

A video encoder may use an adaptive Wiener filter inside the core video encoding loop to improve coding efficiency. In one embodiment, the Wiener filter may be on the input to a motion estimation unit and, in another embodiment, it may be on the output of a motion compensation unit. The taps for the Wiener filter may be determined based on characteristics of at least a region of pixel intensities within a picture. Thus, the filtering may be adaptive in that it varies based on the type of video being processed.

6 Claims, 6 Drawing Sheets

Related U.S. Application Data

14/104,028, filed on Dec. 12, 2013, now Pat. No. 9,247,253, which is a division of application No. 13/466,243, filed on May 8, 2012, now Pat. No. 8,620,103, which is a division of application No. 12/082,182, filed on Apr. 9, 2008, now Pat. No. 8,195,001.

(51) Int. Cl.

| | | |
|---|---|---|
| H04N 19/172 | (2014.01) | |
| H04N 19/61 | (2014.01) | |
| H04N 19/136 | (2014.01) | |
| H04N 19/177 | (2014.01) | |
| H04N 19/17 | (2014.01) | |
| H04N 19/82 | (2014.01) | |
| H04N 19/176 | (2014.01) | |
| H04N 19/182 | (2014.01) | |
| H04N 19/65 | (2014.01) | |
| H04N 19/157 | (2014.01) | |
| H04N 19/18 | (2014.01) | |
| H04N 19/86 | (2014.01) | |

(52) U.S. Cl.
CPC .......... *H04N 19/17* (2014.11); *H04N 19/172* (2014.11); *H04N 19/176* (2014.11); *H04N 19/177* (2014.11); *H04N 19/18* (2014.11); *H04N 19/182* (2014.11); *H04N 19/61* (2014.11); *H04N 19/65* (2014.11); *H04N 19/82* (2014.11); *H04N 19/86* (2014.11)

(58) Field of Classification Search
CPC ...... H04N 19/17; H04N 19/65; H04N 19/157; H04N 19/18; H04N 19/86; H04N 19/176; H04N 19/182; H04N 19/82
USPC ......................................................... 382/275
See application file for complete search history.

(56) References Cited

U.S. PATENT DOCUMENTS

| | | | |
|---|---|---|---|
| 5,793,796 A | 8/1998 | Hulbert et al. | |
| 5,887,084 A * | 3/1999 | Wober ................... | G06F 17/141 382/240 |
| 5,943,170 A | 8/1999 | Inbar | |
| 5,946,421 A | 8/1999 | Kim | |
| 6,067,125 A | 5/2000 | May | |
| 6,111,878 A | 8/2000 | Powell | |
| 6,614,441 B1 | 9/2003 | Jiang et al. | |
| 6,628,714 B1 | 9/2003 | Fimoff et al. | |
| 6,865,229 B1 | 3/2005 | Pronkine | |
| 7,003,174 B2 | 2/2006 | Kryukov et al. | |
| 7,110,554 B2 | 9/2006 | Brennan et al. | |
| 7,295,616 B2 | 11/2007 | Sun et al. | |
| 7,397,854 B2 | 7/2008 | Kwon et al. | |
| 7,623,605 B2 | 11/2009 | Wu et al. | |
| 7,657,299 B2 | 2/2010 | Huizenga et al. | |
| 7,812,748 B2 | 10/2010 | Hagmanns | |
| 7,869,993 B2 | 1/2011 | Ojala | |
| 7,885,341 B2 | 2/2011 | Chen et al. | |
| 7,944,975 B2 | 5/2011 | Cha | |
| 8,189,934 B2 | 5/2012 | Wittmann et al. | |
| 8,199,812 B2 | 6/2012 | Ye et al. | |
| 8,243,790 B2 | 8/2012 | Leontaris et al. | |
| 8,369,404 B2 | 2/2013 | Sekiguchi et al. | |
| 8,509,316 B2 | 8/2013 | Rusanovskyy et al. | |
| 8,576,906 B2 | 11/2013 | Andersson et al. | |
| 9,014,263 B2 | 4/2015 | Leontaris et al. | |
| 9,014,280 B2 | 4/2015 | Ye et al. | |
| 9,247,253 B2 | 1/2016 | Chiu et al. | |
| 9,253,504 B2 | 2/2016 | Lai et al. | |
| 2004/0161035 A1 | 8/2004 | Wedi | |
| 2006/0008007 A1 | 1/2006 | Olivier et al. | |
| 2006/0013292 A1 | 1/2006 | Despain | |
| 2006/0241929 A1 | 10/2006 | Ferris | |
| 2007/0030894 A1 | 2/2007 | Tian | |
| 2007/0092000 A1 | 4/2007 | Chen et al. | |
| 2008/0031336 A1 | 2/2008 | Yamaguchi | |
| 2008/0089417 A1 | 4/2008 | Bao | |
| 2008/0170615 A1 * | 7/2008 | Sekiguchi ............... | H04N 19/70 375/240.14 |
| 2009/0097545 A1 * | 4/2009 | Ugur .................... | H04N 19/176 375/240.02 |
| 2009/0154567 A1 | 6/2009 | Lei | |
| 2009/0290637 A1 | 11/2009 | Lai et al. | |
| 2014/0321540 A1 * | 10/2014 | Leontaris ............. | H04N 19/597 375/240.03 |

OTHER PUBLICATIONS

Lee, J., "Automatic prefilter control by video encoder statistics," May 23, 2002, Electronics Letters, vol. 38, No. 11 Retrieved on Feb. 9, 2012 from Internet: <http://ieeexplore.ieee.org/stamp.jsp?arnumber=01006784>.

Simsek, G., "An approach to summarize video data in compressed domain," A thesis submitted to the Graduate School of Engineering and Sciences of Izmir Institute of Technology, in partial fulfillment of the requirements for the Degree of Master of Science in Electrical and Electronics Engineering, May 2007 (69 pages).

Song, B.Y., et al. "Noise Power Estimation for Effective De-noising in a Video Encoder," 2005, IEEE, [Retrieved on Jan. 9, 2012 from Internet:<ieeexplore.ieee.org/iel5/9711/30651/014154.15.pdf].

Vatis, Y., et al., "Coding of Coefficients of two-dimensional non-separable Adaptive Interpolation Filter," Visual Communications and Image Processing (VCIP), Proc. of SPIE, Beijing, China, Jul. 2005, vol. 5960 (9 pages).

Wittmann, S. et al., "SEI message on post-filter hints," JVT document JVT-U035, Joint Video Team (JVT) of ISO/IEC JTC1/SC29/WG11 & ITU-T SG16 Q6, Hangzhou, China, Oct. 2006 (11 pages).

Chinese Patent Office, Office action in corresponding CN Application 200910141918.7, dated Dec. 24, 2010 (5 pages).

European Patent Office, European Patent Search issued in corresponding EP Application No. 09251058.5 dated Jan. 7, 2011 (3 pages).

Ekstrom, Michael P., "Realizable Wiener Filtering in Two Dimensions," Feb. 1982, IEEE Transactions on Acoustics, Speech, and Signal Processing, vol. ASSP-30, No. 1, retrieved from URL:<http://ieeexplore.ieee.org/stamp/stamp.jsp?arnumber=1163844>.

Chinese Patent Office, Office Action in corresponding CN Application No. 201310098646.3, dated May 6, 2015 (32 pages).

Chinese Patent Office, Office Action in corresponding CN Application No. 201310098646.3, dated Dec. 28, 2015 (32 pages).

Chinese Patent Office, Office Action in corresponding CN Application No. 201310098646.3, dated May 9, 2016 (34 pages).

Chinese Patent Office, Office Action in corresponding CN Application No. 201310098646.3, dated Oct. 20, 2016 (7 pages).

European Patent Office, Office Action in corresponding EP Application No. 16020103.4, dated Jul. 19, 2016 (4 pages).

European Patent Office, Office Action in corresponding EP Application No. 09251058.5, dated Oct. 6, 2016 (4 pages).

Chinese Office Action in corresponding CN application No. 201510020891.1 dated Apr. 19, 2017.

United States Office Action in corresponding U.S. Appl. No. 14/959,417 dated Apr. 12, 2017.

Second Chinese Office Action in corresponding divisional CN application No. 201510020891.1 dated Feb. 27, 2018 (8 pages).

CN Supplemental Search Report n corresponding divisional CN application No. 201510020891.1 dated Feb. 9, 2018 (2 pages).

* cited by examiner

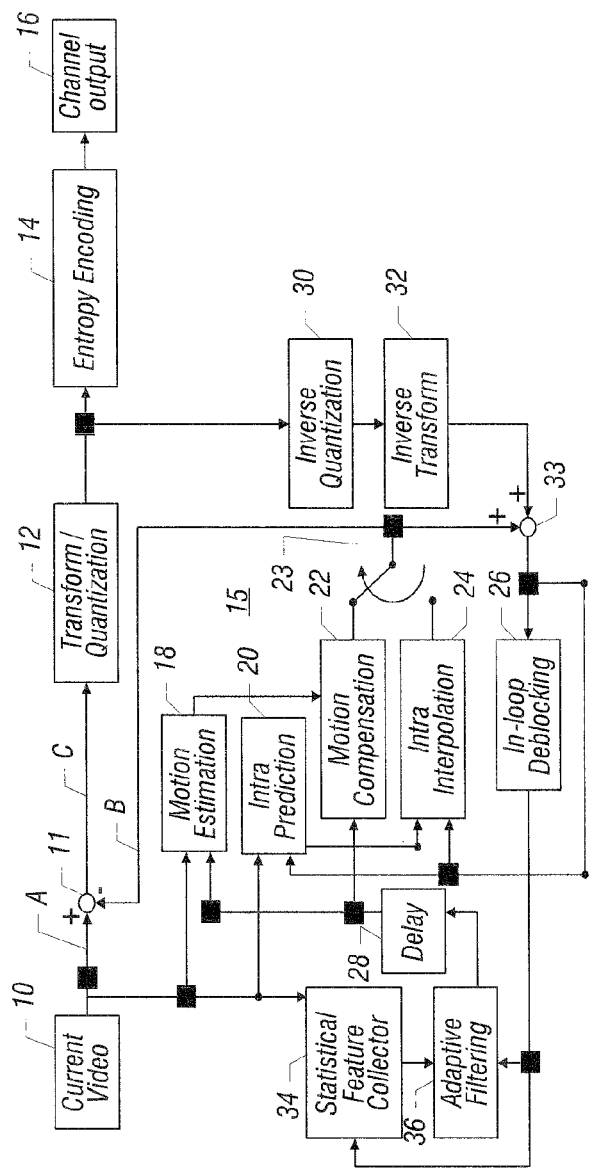
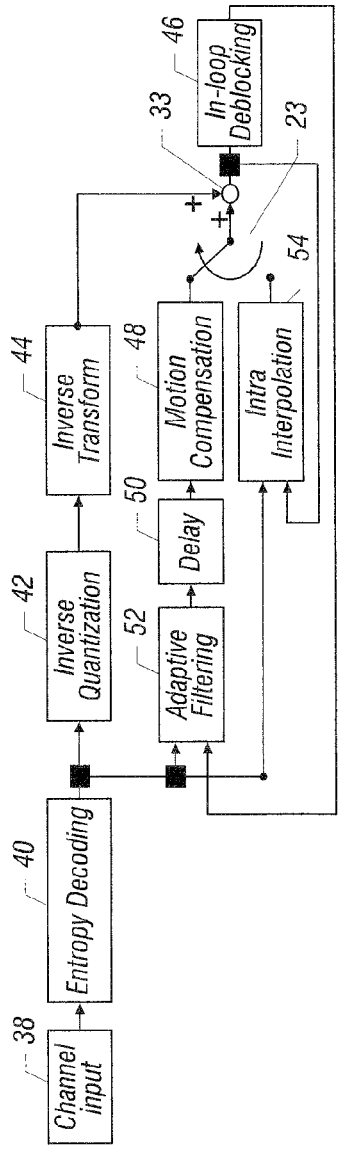
FIG. 1
FIG. 2

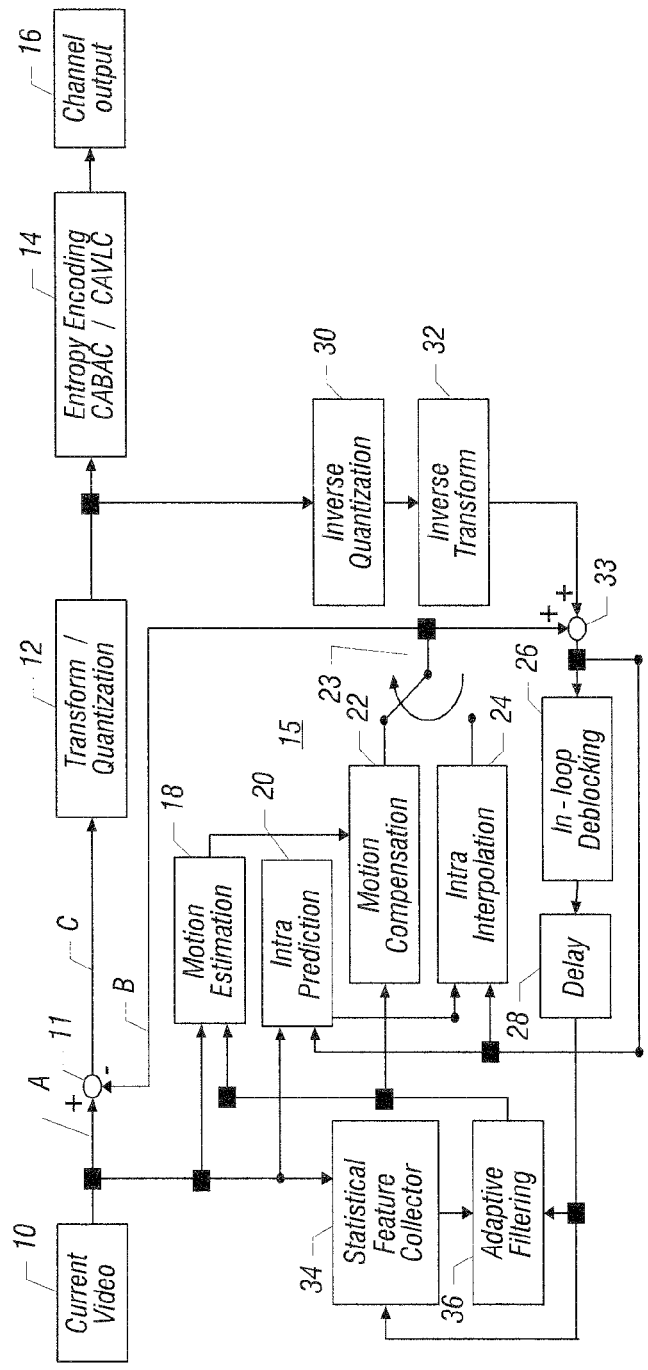
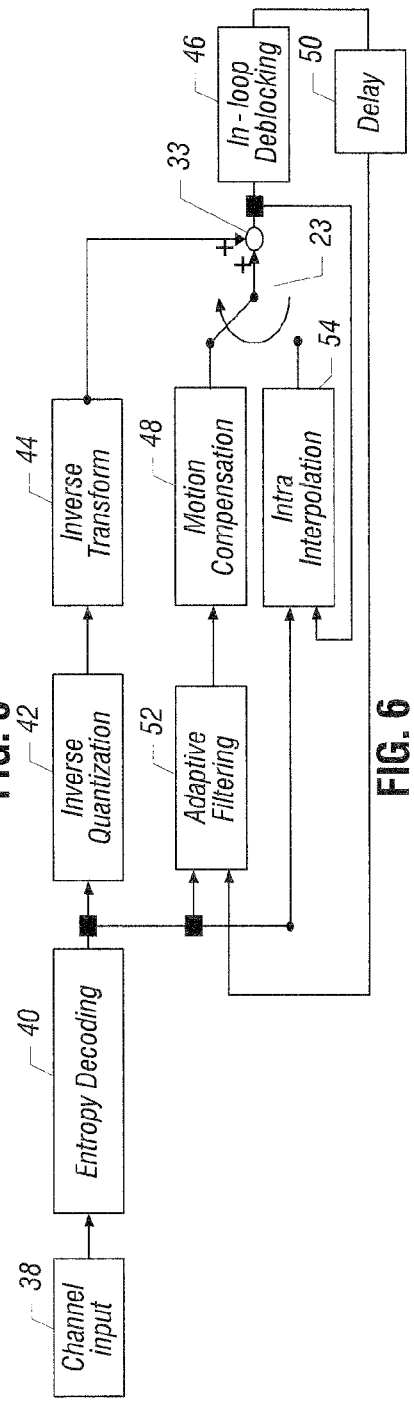
FIG. 5
FIG. 6

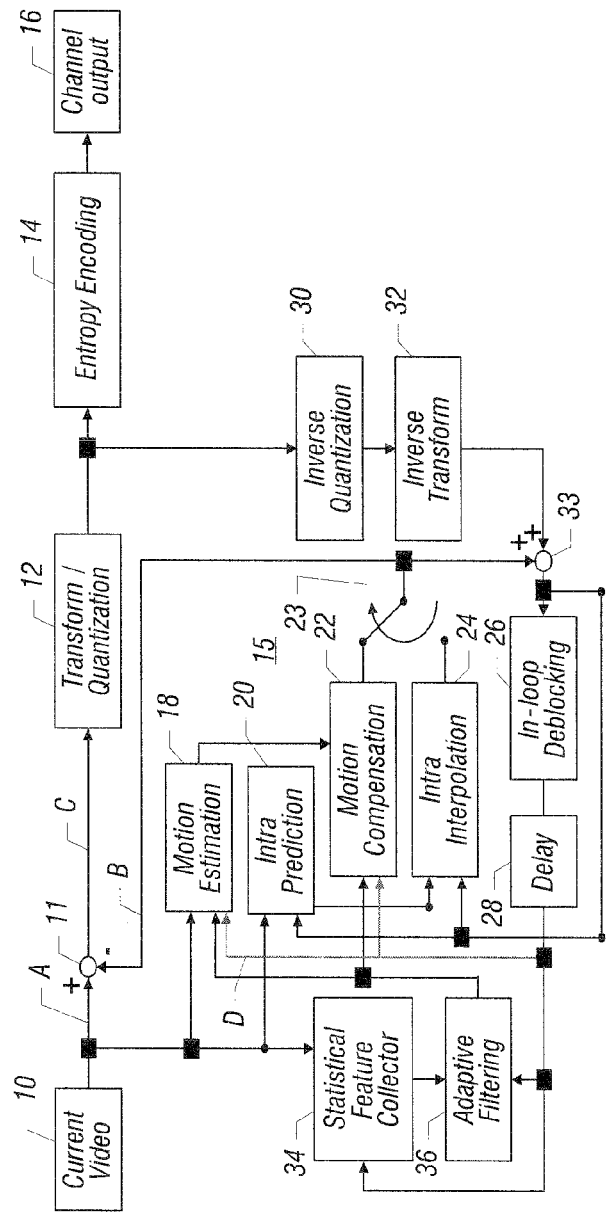
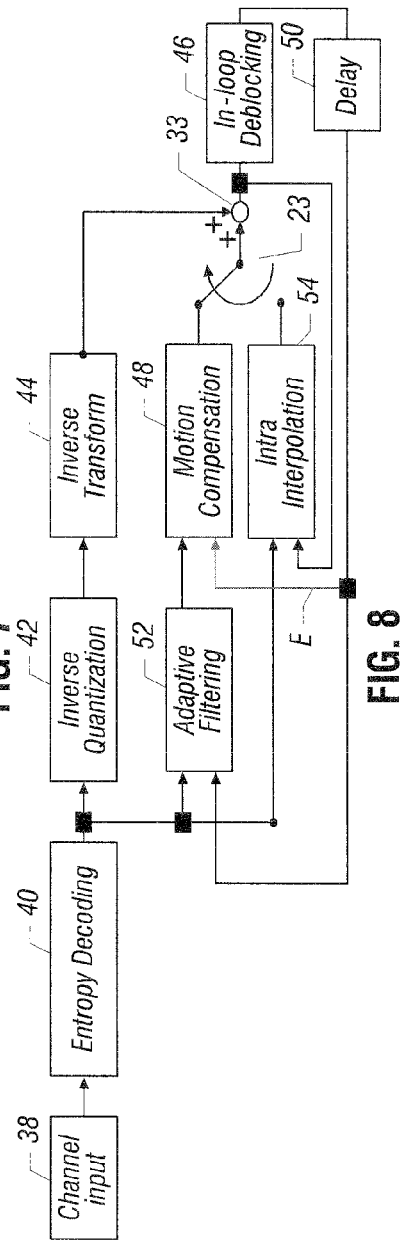
FIG. 7
FIG. 8

IN-LOOP ADAPTIVE WIENER FILTER FOR VIDEO CODING AND DECODING

CROSS-REFERENCE TO RELATED APPLICATIONS

This application is a continuation of continuation application Ser. No. 14/959,417 filed on Dec. 4, 2015 which is a divisional application U.S. patent application Ser. No. 14/104,028, filed Dec. 12, 2013, issued as U.S. Pat. No. 9,247,253 on Jan. 26, 2016, which is a divisional of U.S. patent application Ser. No. 13/466,243, filed May 8, 2012, issued as U.S. Pat. No. 8,620,103 on Dec. 31, 2013, which is a divisional of Ser. No. 12/082,182, filed on Apr. 9, 2008, which issued as U.S. Pat. No. 8,195,001 on Jun. 5, 2012.

BACKGROUND

This relates generally to codecs or video encoders and decoders.

A video encoder compresses video information so that more information can be sent over a given bandwidth. The compressed signal may then be transmitted to a receiver that decodes or decompresses the signal prior to display.

Conventional video encoding algorithms result in losses. That is, in the course of compressing the video information, some information may be lost, resulting in decreased picture quality. Ideally, the video quality is improved to the greatest possible extent and the compression is increased to the greatest possible extent. However, these two goals tend to conflict with one another.

BRIEF DESCRIPTION OF THE DRAWINGS

FIG. 1 is a schematic depiction of an encoder according to one embodiment;

FIG. 2 is a schematic depiction of a decoder for use in connection with the encoder shown in FIG. 1 in accordance with one embodiment;

FIG. 5 is still another embodiment of an encoder in accordance with one embodiment of the present invention;

FIG. 6 is a depiction of a decoder for use with the encoder in FIG. 5 in accordance with one embodiment;

FIG. 7 is a depiction of an encoder in accordance with another embodiment of the present invention;

FIG. 8 is a depiction of a decoder for use with the encoder shown in FIG. 7 in accordance with one embodiment;

DETAILED DESCRIPTION

Figure 3:
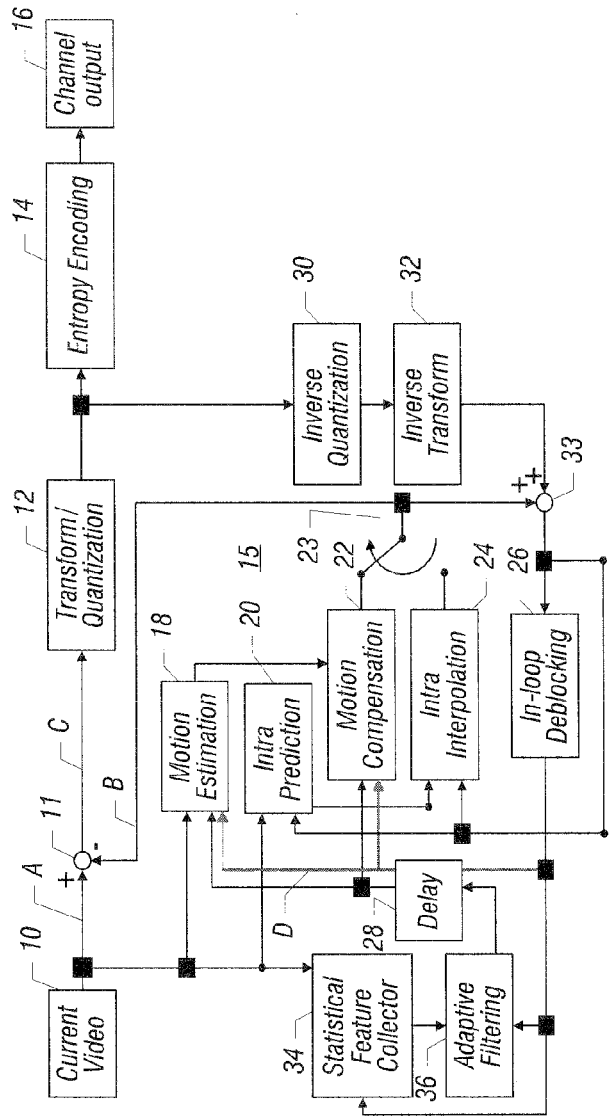
FIG. 3 is a schematic depiction of another encoder in accordance with another embodiment of the present invention.

Referring to FIG. 1, the current video information may be provided from a current video block 10 in a form of a plurality of pictures or frames. The current video is passed to a differencing unit 11. The differencing unit 11 is part of the Differential Pulse Code Modulation (DPCM) (also called the core video encoding) loop 15, which includes a motion compensation stage 22 and a motion estimation stage 18. The loop 15 may also include an intra prediction stage 20, intra interpolation stage 24, and delay line 28. In some cases, an in-loop de-blocking filter 26 may also be used in the loop 15.

The current video is provided to the differencing unit 11 and to the motion estimation stage 18. The motion compensation stage 22 or the intra interpolation stage 24 produce an output at B through a switch 23 that is then subtracted from the current video 10 at A to produce a residual at C. The residual is then transformed and quantized at block 12 and subjected to entropy encoding in block 14. A channel output results at block 16.

The output of motion compensation or inter-interpolation is also provided to a summer 33 that receives an input from inverse quantization unit 30 and inverse transform unit 32 (that undo the transformation and quantization of the unit 12). The inverse transform unit 32 provides dequantized and detransformed information back to the loop 15.

"Coding efficiency" is an indication of the extent to which the DPCM loop 15 is effective in reducing the residual or difference between the prediction picture B from the loop and the current picture A. Coding efficiency affects ultimate picture quality.

The encoder of FIG. 1 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

A block-based coding may utilize transform quantization unit 12, motion estimation unit 18, and entropy encoding unit 14 on the residue C of the motion compensated or intra interpolated block. A macro block may include 16×16 luma pixels. A macro block can be further partitioned into smaller 16×8, 8×16, and 8×8 blocks. Each 8×8 block, called a sub-macro block, can be further divided into smaller 8×4, 4×8, and 4×4 blocks.

H.264 allows users to use the motion compensation prediction from the reference pictures in two reference lists that consist of multiple pictures. The quantization unit 12 performs a lossy process to compress the data rate to meet the bandwidth requirements of application at the cost of picture quality. The information loss during the quantization process is unrecoverable and, thus, coding artifacts are observed, such as blocking noise. An in-loop de-blocking filter 26 may smooth the picture part of motion estimation and motion compensation in some embodiments.

In-loop adaptive filtering 36 may be achieved by a Wiener filter. A Wiener filter is a filter that achieves the least mean square error among the source signal and the predicted signal modeled through the random noise. "In-loop," with respect to an encoder, means any module, stage or unit of a differential pulse code modulation loop whose output is fed back to the differencing unit. The corresponding parts of a decoder to decode the results of in-loop decoding are also "in-loop." "Adaptive filtering" means that filtering is content dependent or based on an analysis of pixel intensities in a portion of a picture, a picture as a whole, or a plurality of successive pictures. For example, the type of video information that is received, be it graphics or stream view video, results in different taps in the Wiener filter for different types of video. Thus, adaptive filter taps are the result of an examination of the intensity of each pixel in a given picture portion, picture, or series of pictures.

The adaptive filtering 36 receives an input from a statistical feature collector 34 and, in one embodiment, from the de-blocking filter 26. Its output is provided via a delay unit 28 to both the motion compensation unit 22 and the motion estimation unit 18 in one embodiment. Thus, the adaptive filtering 36 is applied to the input of the motion estimation and motion compensation stages 18 and 22.

The statistical feature collector 34 receives an input from the de-blocking filter 26, in one embodiment, and receives the current video on the line A. The statistical feature collector 34 calculates the weight $c_i$, which is applied to a reconstructed mapped pixel $y_i$. The weight $c_i$ is used to calculate the filter taps for a Wiener filter that does the adaptive filtering 36. The statistical feature collector 34 analyzes each pixel of a picture and determines how groups of pixels across a region of a picture or across multiple pictures vary in intensity to determine what type of video is being received and what adaptive filtering should be done. Based on this information, it sets the filter taps for the Wiener filter in the adaptive filtering unit 36 to reduce the resulting residual at C.

Referring next to FIG. 2, a decoder for the encoder of FIG. 1 includes a channel input 38 coupled to an entropy decoding unit 40. The output from the decoding unit 40 is provided to an inverse quantization unit 42 and an inverse transform unit 44 and to an adaptive filtering unit 52. The adaptive filtering unit 52 is coupled to a delay 50 and to a motion compensation unit 48. The output of the entropy decoding unit 40 is also provided to an intra interpolation unit 54, which feeds a selector switch 23. The information from the inverse transform unit 44 and the motion compensation unit 48, or the intra interpolation unit 54, as selected by the switch 23, are then summed and provided to an in-loop de-blocking unit 46. The output of the in-loop de-blocking unit 46 is then fed back to the adaptive filtering 52. The adaptive filtering 52 may also use a Wiener filter.

The output from the encoding operation may include a frame that has a header that indicates information about the filter taps used by the encoder's adaptive filtering. That header information is then used to set the appropriate filter taps in the adaptive filtering 52.

The encoder of FIG. 3 is similar to the encoder of FIG. 1. The most significant difference is the fact that a line D goes from the in-loop de-blocking filter 26 in FIG. 3, all the way up to the motion estimation unit 18 through delay 28. In some embodiments, the line D may be switched or switchable so that the line D may be provided or not provided, as desired. Thus, in some embodiments, the adaptive filtering 36 may be supplemented, in the motion estimation unit 18, by information from the line D.

The in-loop adaptive Wiener filtering scheme is scalable and could be extended to include the de-blocked pictures, in addition to the adaptive filtered picture, to serve as the reference picture for the phase of the motion estimation, as indicated in FIG. 3. This may double the amount of the reference pictures to improve the accuracy of motion estimation without much extra information needed to be sent from the video encoder side because the de-blocked picture is always accessible on the video decoder side.

Figure 4:
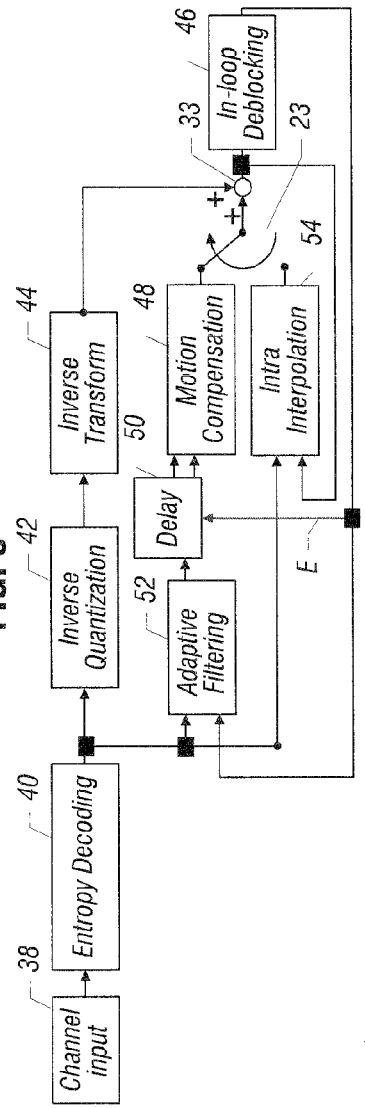
FIG. 4 is a depiction of a decoder for use in connection with the encoder of FIG. 3 in accordance with one embodiment.

Similarly, the decoder, shown in FIG. 4, for the encoder of FIG. 3, differs from the decoder of FIG. 2 in the addition of the line E that provides the output from the in-loop de-blocking filter 46 to the motion compensation unit 48 through delay 50.

Moving to FIG. 5, an encoder corresponds generally to the encoder of FIG. 1, with the delay 28 being moved to the input to adaptive filtering 36, instead of its output. The delay 28, placed after the de-blocking filter 26, produces multiple adaptive filter taps for each picture in the reference picture list per picture time.

With the delay 28 after the de-blocking 26, the production of the adaptive filter taps can be re-calculated per each picture time based on the current input picture versus the reference pictures in the buffer list. Thus, the video encoder updates the filter taps for each reference picture.

The corresponding decoder, shown in FIG. 6, differs from the decoder in FIG. 2 in that the delay 50 is moved to the output of in-loop de-blocking filter 46 and the input to the adaptive filtering 52, instead of being on its output, as was the case in FIG. 2.

Referring next to FIG. 7, an encoder corresponds generally to the encoder of FIG. 5, with the addition of the line D of FIG. 3.

The decoder of FIG. 8 for the encoder of FIG. 7, corresponds to the decoder of FIG. 6, with the addition of the line E from the embodiment of FIG. 4.

Figure 9:
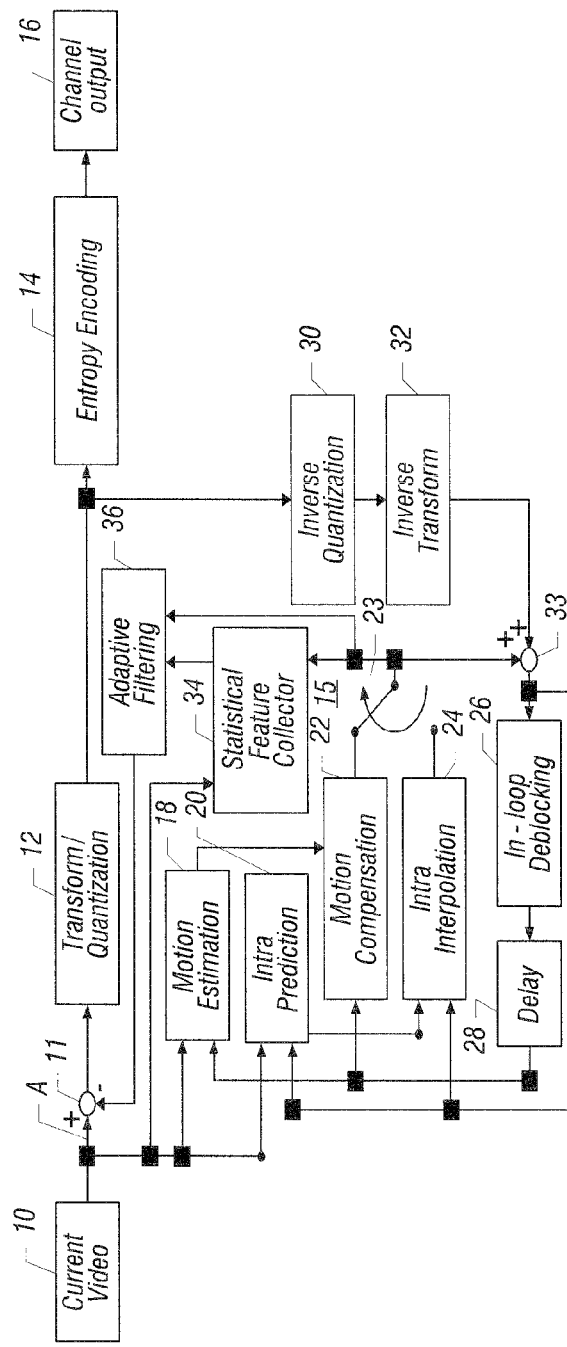
FIG. 9 is a depiction of an encoder in accordance with another embodiment of the present invention.

The encoder of FIG. 9 differs from the encoder of FIG. 1 in that the statistical feature collector 34 and adaptive filter 36 are moved from the input to the motion estimation unit 18 to the output of a motion compensation unit 22. However, its function remains substantially the same, that being to reduce the residual C.

The statistical feature collector 34 and the adaptive filtering 36 are added to the output of the motion compensated picture to find the solution of minimal mean square error among the input video and the motion compensated picture. This leads to better coding efficiency in some cases. Adaptive filtering after motion compensation is independent of the adaptive filtering before the motion estimation unit 18, as depicted in FIGS. 1 to 8. Thus, this location for collector 34 and filtering 36 could also serve as an add-on to FIGS. 1 to 8.

Figure 10:
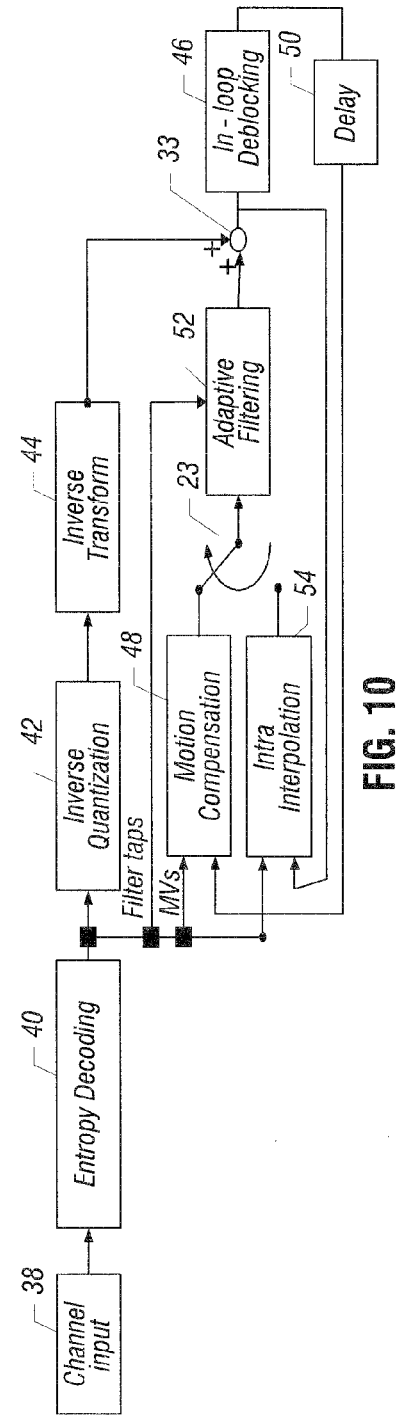
FIG. 10 is a depiction of a decoder for use with the encoder of FIG. 9.

The decoder of FIG. 10 (for use with the encoder of FIG. 9) is substantially the same as the decoder of FIG. 2 except the adaptive filtering 52 is moved to the output of the motion compensation unit 48, the delay unit 50 is moved to the output of the in-loop de-blocking filter 46, and the filter taps are provided (around the motion compensation unit 48) directly to where they are needed in the adaptive filtering unit 52, while the motion vectors (MVs) are provided to the motion compensation unit 48 where they are needed.

In some embodiments, the in-loop adaptive filtering using a Wiener filter improves the quality of the de-blocked pictures and improves the reference picture for the phase of the motion estimation and the next encoding picture. The Wiener filter is a well known optimal linear filter that copes with pictures degraded by Gaussian noise, blurring, and distortion. The compression effect of coding loss is modeled as a random noise added to the original input pixels and coding efficiency may be improved by applying the Wiener filter in-loop. The information about the Wiener filter taps may then be applied as global information at the picture level and this is block based free and has no serial dependency from reconstructed neighboring pixels in some embodiments.

The statistical feature collector 34 and the in-loop adaptive filtering 36 may result in a better match among the reconstructed picture and the original video A in order to achieve better coding efficiency. The operation of these modules may be based on a sequence of pictures, a picture or some regions within a picture.

The derivation of the filter taps by the collector 34 is as follows.

Consider the input pixel $x_k$ and the output of the Wiener filter $z_k$ consisting of the reconstructed pixel $y_i$ in the filter support $\{S\}$, sized as L+1, with the weight $c_i$. The adaptive (Wiener) filter function is $$z_k = \sum_{i \in \{S\}} y_i \cdot c_i \quad [1]$$

The residual signal C among input pixel $x_k$ and the Wiener filtered pixel $z_k$ is defined as $$\text{error}_k = z_k - x_k \quad [2]$$

The Wiener filter is optimized by minimizing the mean square error with the filter taps $\{c_i\}$ $$c_i = \arg\min E[\text{error}_k^2] \quad [3]$$

where E[ ] is the expectation of the square of the residual signal for the pixels of interest which could be the pixels from a sequence of pictures, a picture, or some region inside a picture.

$$E[\text{error}_k^2] = \quad [4]$$
$$E[(z_k - x_k)^2] = E\left[\left(\sum_{i \in \{S\}} y_i \cdot c_i\right)^2\right] + E[(x_k)^2] - 2E\left[\left(\sum_{i \in \{S\}} y_i \cdot c_i\right)(x_k)\right]$$

To find the minimum of $E[\text{error}_k^2]$, the derivative with respect to $c_i$ is taken. The filter taps may be derived by letting the derivative being equal to zero, $$\frac{\partial}{\partial c_i} E[\text{error}_k^2] = 2\left(\sum_{j \in \{S\}} E[(y_i)(y_j)]c_j\right) - 2E[(y_i)(x_k)] = 0 \quad i = 0, \ldots, L \quad [5]$$

The autocorrelation function of $\{y\}$ in Equation [6] below and the cross-correlation function among $\{y\}$ and $\{x\}$ in Equation [7] below is denoted:

$$r_{yy}(i) = E[y_k y_{k+i}] \quad [6]$$

$$r_{xy}(i) = E[x_k y_{k+i}] \quad [7]$$

Equation [5] may be rewritten in the matrix form as:

$$\begin{bmatrix} r_{yy}(0) & r_{yy}(1) & \cdots & r_{yy}(L) \\ r_{yy}(1) & r_{yy}(0) & \cdots & r_{yy}(L-1) \\ \vdots & \vdots & \ddots & \vdots \\ r_{yy}(L) & r_{yy}(L-1) & \cdots & r_{yy}(0) \end{bmatrix} \begin{bmatrix} c_0 \\ c_1 \\ \vdots \\ c_L \end{bmatrix} = \begin{bmatrix} r_{xy}(0) \\ r_{xy}(1) \\ \vdots \\ r_{xy}(L) \end{bmatrix} \quad [8]$$

Thus, the Wiener filter tap set $\{C\}$ can be derived in the matrix format as:

$$R_{yy} \cdot C = R_{xy} => C = R_{yy}^{-1} \cdot R_{xy} \quad [9]$$

where $R_{yy}^{-1}$ is the inverse matrix of the auto-correlation matrix in Equation [9].

The statistical feature selector 34 determines the weight $c_i$, using the equations [6 and 7] to fill out the matrix of equation [8] and then does the calculation of equation [9] to determine the weight $c_i$. The equation [9] is the final answer of the value $c_i$ that indicates the taps for the Wiener filter. In some embodiments, the same filter taps are used across the entire picture, but the taps may vary from frame to frame or picture to picture.

The Equations [6-7] can be expressively indexed in the two dimensional format in Equations [10-11] below for a non-separable filter with the size L+1=(2l+1)*(2l+1):

$$r_{yy}(m, n) = \quad [10]$$
$$\sum_{j=0}^{j=height-1} \sum_{i=0}^{i=width-1} y_{i,j} \cdot y_{i+m,j+n} \approx \sum_{j=l}^{j=height-l-1} \sum_{i=l}^{i=width-l-1} y_{i,j} \cdot y_{i+m,j+n}$$

$$r_{xy}(m, n) = \quad [11]$$
$$\sum_{j=0}^{j=height-1} \sum_{i=0}^{i=width-1} x_{i,j} \cdot y_{i+m,j+n} \approx \sum_{j=l}^{j=height-l-1} \sum_{i=l}^{i=width-l-1} x_{i,j} \cdot y_{i+m,j+n}$$

where m, n are in the range of (−l, l).

The collection of auto-correlation function in Equation [6] and [10] can be obtained at the video decoder side, but the cross-correlation in Equations [7] and [11] is derived at video encoder side because the input $\{x\}$ is only available at video encoder side. Thus, the filter taps derived in Equation [9] are transmitted from video encoder to video decoder.

The transmitting of the cross-correlation function, instead of the derived filter taps, is sufficient in some cases because video decoder could derive the filter taps with the reception of cross-correlation function plus the decoded deblocked data $\{y\}$ at its own hand.

More accurate statistical information to improve coding efficiency may be achieved further by skipping the pixels close to the picture border in one embodiment. The right hand side of Equations [10-11] expresses this skipping.

The filter taps may also be derived per luma and per chroma channel respectively. Better coding efficiency is achieved for chroma picture based on the filter taps derived with only chroma pixel. In some scenarios, the one chroma table may be shared by both Cb and Cr channels, or two individual tables may be used for Cb and Cr respectively.

In some embodiments, the coding efficiency of the in-line Wiener adaptive filtering may be better than the case that only applies the de-blocking filter. In such case, the de-blocking filter may be removed from the core coding loop 15. With this replacement, any of the systems of FIGS. 1-10 may be produced without the de-blocking filter.

The right side of equations [10 and 11] are two dimensional approximations of equations [6 and 7], excluding edge pixels near the pixel borders. This may improve picture quality because, at the picture borders, the absence of neighbors results in dimensioned value data.

Figure 11:
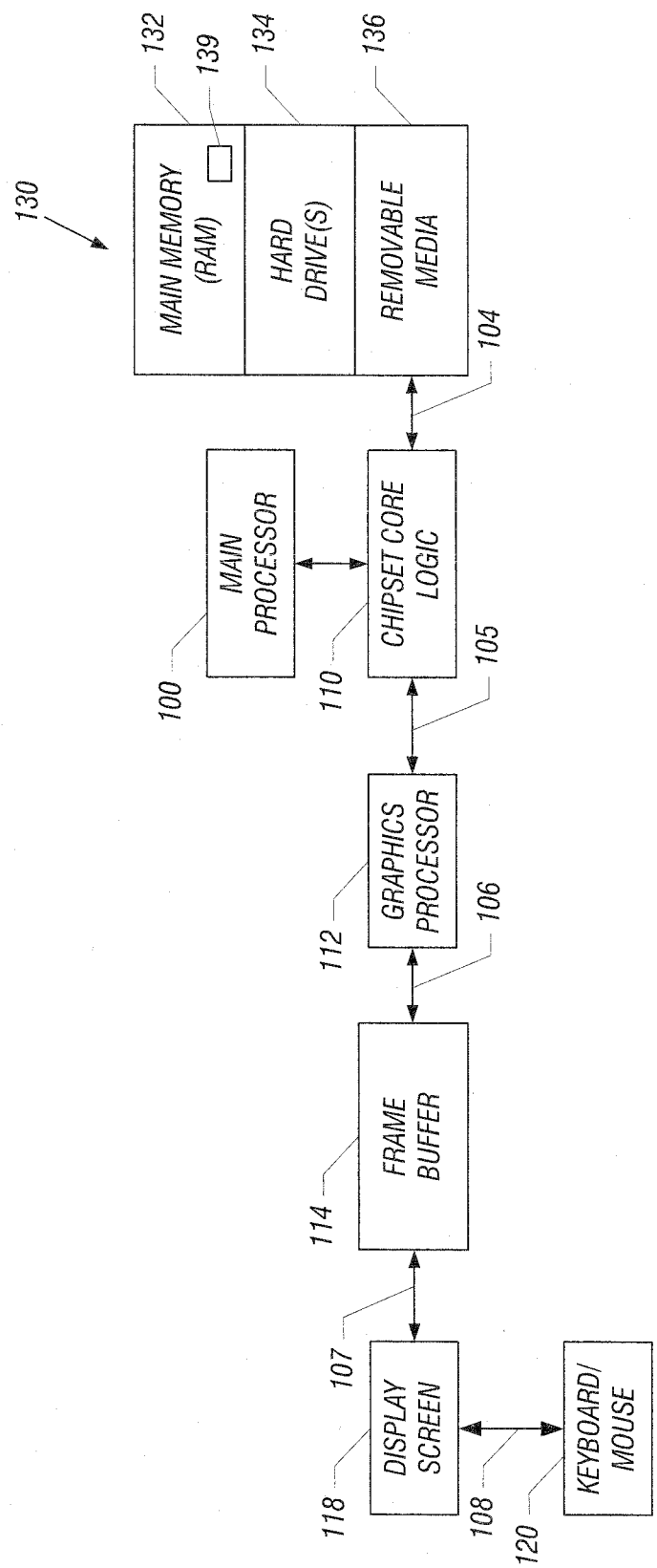
FIG. 11 is a system depiction for one embodiment.

Referring to FIG. 11, the encoders and decoders depicted in FIGS. 1-10 may, in one embodiment, be part of a graphics processor 112. In some embodiments, the encoders and decoders shown in FIGS. 1-10 may be implemented in hardware and, in other embodiments, they may be implemented in software or firmware. In the case of a software implementation, the pertinent code may be stored in any suitable semiconductor, magnetic or optical memory, including the main memory 132. Thus, in one embodiment, source code 139 may be stored in a machine readable medium, such as main memory 132, for execution by a processor, such as the processor 100 or the graphics processor 112.

A computer system 130 may include a hard drive 134 and a removable medium 136, coupled by a bus 104 to a chipset core logic 110. The core logic may couple to the graphics processor 112 (via bus 105) and the main processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

The blocks indicated in FIGS. 1 to 10 may constitute hardware or software components. In the case of software components, the figures may indicate a sequence of instructions that may be stored in a computer readable medium such as a semiconductor integrated circuit memory, an optical storage device, or a magnetic storage device. In such case, the instructions are executable by a computer or processor-based system that retrieves the instructions from the storage and executes them. In some cases, the instructions may be firmware, which may be stored in an appropriate storage medium. One result of the execution of such instructions is the improvement of quality of pictures that are ultimately displayed on a display screen.

The following clauses and/or examples pertain to further embodiments:

One example embodiment may be a method comprising using an adaptive Wiener filter in a video encoder to improve coding efficiency and connecting a de-blocking filter to a motion estimation unit through a delay element and in parallel to said Wiener filter. The method may include using said Wiener filter on the input to a motion estimation unit. The method may include using said Wiener filter on the output of a motion compensation unit. The method may include setting taps of said Wiener filter based on an analysis of pixels within a picture. The method may include calculating a coefficient to correct remapped pixels based on pixel intensities in a picture. The method may include adjusting taps of said filter to minimize an error made up of the difference between a current picture and a predicted picture. The method may include providing a delay element on the output of said Wiener filter. The method may include providing a delay element on the output of a de-blocking filter.

Another example embodiment may be a computer readable medium storing instructions that, if executed, enable a processor-based system to perform a sequence, using an in-loop adaptive Wiener filter in a video encoder to improve coding efficiency, and setting taps of said Wiener filter based on an analysis of pixels by excluding pixels around a picture border. The medium may include further storing instructions to provide the Wiener filter output to the input of a motion estimation stage. The medium may include further storing instructions to use the Wiener filter on the output of a motion compensation stage. The medium may include further storing instructions to use said Wiener filter in place of a de-blocking filter. The medium may include further storing instructions to exclude pixels around a picture border when setting the taps of said Wiener pixels based on an analysis of pixels in a picture. The medium may include further storing instructions to calculate a coefficient to correct remapped pixels based on pixel intensities in a picture. The medium may include further storing instructions to adjust taps of said Wiener filter to minimize an error made up of the difference between a current picture and a predicted picture. The medium may include further storing instructions to provide a delay element on the output of said Wiener filter. The medium may include further storing instructions to provide a delay on the output of a de-blocking filter.

In another example embodiment may be a video encoder comprising an adaptive Wiener filter to improve coding efficiency, a motion estimation unit, a deblocking filter connected to the motion estimation unit through one delay element and in parallel to the Wiener filter, and a delay element. The encoder may include the filter having taps set based on an analysis of pixels by excluding pixels around a picture border. The encoder may include using said Wiener filter on the input to a motion estimation unit. The encoder may include using said Wiener filter on the output of a motion compensation unit. The encoder may include adjusting taps of said filter to minimize an error made up of the difference between a current picture and a predicted picture. The encoder may include providing a delay element on the output of said Wiener filter. The encoder may include providing a delay element on the output of a de-blocking filter.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A video encoder having an input to receive video and a channel output comprising:
   a transform/quantizer having an input and at least one output;
   an adder having three inputs and an output coupled to said transform/quantizer input, one of said adder inputs coupled to receive said video;
   an inverse quantizer having an input coupled to said transform/quantizer output;
   an adaptive Wiener filter having a first input coupled to said inverse quantizer output and one of said adder inputs, said filter having a second input coupled to receive reconstructed image data, said filter to set filter taps based on the reconstructed image data, said filter having an output coupled to one of said adder inputs; and
   an entropy coding having an input coupled to said transform/quantizer output, said entropy coding coupled to said channel output.

2. The video encoder of claim 1 including a de-blocking filter having an input and an output, said de-blocking filter output coupled to said first Wiener filter input and said de-blocking filter input coupled to said inverse quantizer.

3. A non-transitory computer readable medium storing instructions that, when executed, enable a video encoder having an input to receive video and a channel output to:
   transform/quantize a video stream in a transform/quantizer having an input and a first output and a second output and feed back the video stream to an inverse quantizer having an input coupled to the transform/quantizer first output and an adaptive Wiener filter having an input coupled to said inverse quantizer output and a first input for an adder having an output, said adder including a second input coupled to said receive said video, said adder output coupled to said input of said transform/quantizer, said filter having another input coupled to receive reconstructed image data, said filter to set filter taps based on reconstructed image data, said filter having an output coupled to a second adder input; and entropy coding having an input to receive the transform/quantizer second output, said entropy coding coupled to said channel output.

4. The medium of claim 3 further storing instructions to use a de-blocking filter.

5. A method using a video encoder having an input to receive video and a channel output comprising:

transforming/quantizing a video stream in a transform/quantizer having an input, a first output and a second output;

feeding back the transformed/quantized input video stream to an inverse quantizer having an input coupled to the first transform/quantizer output and an adaptive Wiener filter having an input coupled to said inverse quantizer output and a first input for an adder having an output, said adder including a second input coupled to said receive said video, said adder output coupled to said input of said transform/quantizer, said filter having another input coupled to receive reconstructed image data, said filter to set filter taps based on reconstructed image data, said filter having an output coupled to said first adder input; and entropy coding having an input to receive the second output of the transform/equalizer video stream, said entropy coding coupled to said channel output.

6. The method of claim 5 including using a de-blocking filter.

* * * * *